(12) United States Patent
Harish et al.

(10) Patent No.: US 11,716,400 B2
(45) Date of Patent: Aug. 1, 2023

(54) METHODS CIRCUITS DEVICES SYSTEMS AND FUNCTIONALLY ASSOCIATED MACHINE EXECUTABLE CODE FOR RECOMMENDATION AND DISTRIBUTION OF DIGITAL CONTENT

(71) Applicant: IRONSOURCE LTD., Tel Aviv (IL)

(72) Inventors: Arnon Harish, Tel Aviv (IL); Sagi Ben Basat, Tel Aviv (IL)

(73) Assignee: IRONSOURCE LTD., Tel Aviv (IL)

( * ) Notice: Subject to any disclaimer, the term of this patent is extended or adjusted under 35 U.S.C. 154(b) by 0 days.

(21) Appl. No.: 15/234,324

(22) Filed: Aug. 11, 2016

(65) Prior Publication Data

US 2017/0048355 A1 Feb. 16, 2017

Related U.S. Application Data

(60) Provisional application No. 62/203,402, filed on Aug. 11, 2015.

(51) Int. Cl.
| | |
|---|---|
| *H04L 29/08* | (2006.01) |
| *G06Q 30/06* | (2023.01) |
| *H04L 67/50* | (2022.01) |
| *G06Q 30/0601* | (2023.01) |

(52) U.S. Cl.
CPC ....... *H04L 67/535* (2022.05); *G06Q 30/0631* (2013.01)

(58) Field of Classification Search
CPC ..... H04W 12/12; H04W 8/245; H04W 4/021; H04W 4/025; H04L 63/14; H04L 41/0233; H04L 41/0253; H04L 41/026; H04L 41/22; H04L 41/06; H04L 67/22; H04L 67/535; G06F 21/60; G06F 21/88; G06F 3/165; G06Q 30/0242; G06Q 30/0269; G06Q 30/0631

See application file for complete search history.

(56) References Cited

U.S. PATENT DOCUMENTS

| | | | |
|---|---|---|---|
| 9,020,446 B2 * | 4/2015 | Manssen | H04B 1/40 333/17.3 |
| 2008/0071761 A1 * | 3/2008 | Singh | H04W 4/029 |
| 2009/0315767 A1 * | 12/2009 | Scalisi | G01S 19/34 342/357.74 |

(Continued)

OTHER PUBLICATIONS

International Application # PCT/IB2022/052708 Search Report dated Jul. 11, 2022.

*Primary Examiner* — Ninos Donabed
(74) *Attorney, Agent, or Firm* — Kligler & Associates Patent Attorneys Ltd

(57) ABSTRACT

Disclosed is a content distribution system including a content server communicatively coupled to a data packet network and running one or more server-side components. A mobile computing device also communicatively coupled to the data packet network and running a client-side component may be configured to: (a) receive from said one or more server-side components a mobile device operational scenario definition; (b) activate or configure one or more monitoring routines in accordance with the device operational scenario definition; and (c) monitor said mobile computing device for an occurrence of the defined operating scenario using the activated or configured monitoring routines.

2 Claims, 8 Drawing Sheets

(56) References Cited

U.S. PATENT DOCUMENTS

| | | | | |
|---|---|---|---|---|
| 2010/0052930 A1* | 3/2010 | Grigsby | ............ | H04W 52/0258 340/663 |
| 2011/0083025 A1 | 4/2011 | Lee | | |
| 2011/0153426 A1* | 6/2011 | Reddy | .................... | G06Q 30/02 705/14.58 |
| 2012/0284704 A1* | 11/2012 | Friedman | .................. | G06F 8/61 717/177 |
| 2012/0303517 A1* | 11/2012 | Kang | .................... | G06Q 10/10 705/39 |
| 2013/0111511 A1* | 5/2013 | Besehanic | ............ | H04N 21/482 725/50 |
| 2013/0211908 A1 | 8/2013 | Yuill et al. | | |
| 2013/0215846 A1* | 8/2013 | Yerrabommanahalli | .................... | H04W 48/18 370/329 |
| 2014/0253377 A1* | 9/2014 | Scalisi | .................... | G01S 19/49 342/357.74 |
| 2015/0065167 A1* | 3/2015 | Scalisi | .................... | G01S 19/48 455/456.1 |
| 2015/0081532 A1* | 3/2015 | Lewis | ................ | G06Q 30/0261 705/39 |
| 2015/0120421 A1* | 4/2015 | Deshpande | ........ | G06Q 30/0224 705/14.25 |
| 2015/0223186 A1* | 8/2015 | Pierrel | .................. | H04L 67/125 455/456.6 |
| 2015/0248712 A1* | 9/2015 | Lacy-Hulbert | .... | G06Q 30/0276 705/14.64 |
| 2015/0262069 A1* | 9/2015 | Gabriel | ............... | G06F 16/9535 706/48 |
| 2015/0289120 A1* | 10/2015 | Harber | .................. | G06Q 50/01 455/414.3 |
| 2015/0310493 A1* | 10/2015 | Chitnis | .............. | G06Q 30/0267 705/14.64 |
| 2016/0202078 A1* | 7/2016 | Scalisi | .............. | G01C 21/3667 701/519 |
| 2016/0301764 A1* | 10/2016 | Ruback | ................. | G06F 3/0482 |
| 2016/0371750 A1 | 12/2016 | Peddinti et al. | | |
| 2017/0094057 A1* | 3/2017 | Naiga | .................. | H04M 3/493 |
| 2017/0214701 A1* | 7/2017 | Hasan | ................ | H04L 63/1491 |
| 2019/0095786 A1 | 3/2019 | Carbune et al. | | |

* cited by examiner

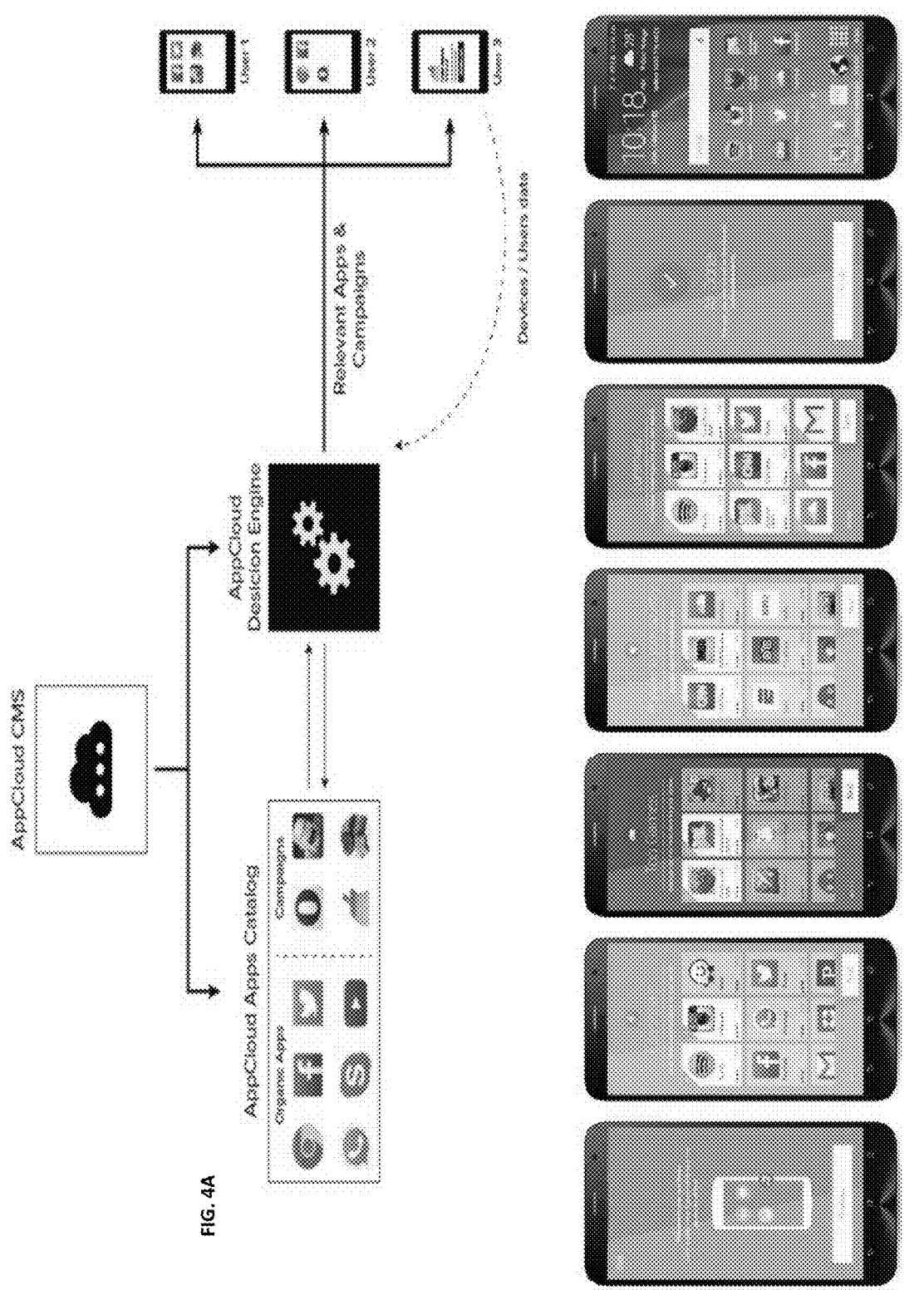

METHODS CIRCUITS DEVICES SYSTEMS AND FUNCTIONALLY ASSOCIATED MACHINE EXECUTABLE CODE FOR RECOMMENDATION AND DISTRIBUTION OF DIGITAL CONTENT

RELATED APPLICATIONS

The present application claims priority from U.S. Provisional Patent Application No. 62/203,402 which was filed with the United States Patent Office on Aug. 11, 2015 and the specification of which is hereby incorporated by reference in its entirety.

FIELD OF THE INVENTION

The present invention generally relates to the field of wireless communication. More specifically, the present invention relates to methods, circuits, devices, assemblies and systems for digital content recommendation and distribution.

BACKGROUND

The ubiquitous mobile communication devices of today, such as smartphones, tablets, wearable computers and laptops, have evolved into powerful computing and content presentation devices capable of rendering and presenting highly rich, interactive and engaging content. These devices are now also capable of running a broad range of software applications, even highly resource demanding applications that previously could only be run on a desktop computer.

Software applications for mobile computing devices already number in the millions, and this number is growing monthly. Applications are available on numerous online marketplace including: Apple's App Store, Google Play, Amazon, etc. Literally, billions of people all around the world are installing and running software applications, of various types and for various purposes, on an almost constant basis.

Likewise, billions of people are regularly consuming online content and engaging with online content services, such as: news publications, music and video streaming, online games, online banking and e-commerce. Since a primary function of many applications is to present complex and interactive content, and since at the same time core functionality of many other applications is being moved online, to cloud computing platforms, the line between digital content and applications is becoming more and more blurred. Accordingly, both software applications and content from online content services may be referred to as digital content.

The extremely large number of applications and immense body of other digital content available for mobile devices may be overwhelming and may actually cause confusion with some mobile communication device users. In some cases, users may find it daunting to search through the huge number of options, and may simply avoid looking for digital content which in fact may be very useful for them.

Therefore, there is a need in the field of digital content distribution for improved methods, circuits, devices, systems and functionally associated machine executable for automatically for recommending and delivering digital content to mobile communication devices.

SUMMARY OF INVENTION

The present invention includes methods, circuits, devices, systems and functionally associated machine executable code for recommendation and distribution of digital content. The term digital content, for purposes of this application, may mean any one or combination of the following: (a) downloaded content such audio and video, (b) streamed content, (c) interactive content from an online source or website, (d) downloaded and installed application, and/or (e) a non-installed application running in a browser, or other runtime environment or sandbox. A system according to some embodiments, may include both server-side components and client-side components, which components may each function independently and substantially autonomously part of the time, and may synchronize with one another intermittently. The client-side components may be integral, installed or otherwise functionally associated with an operating system of a mobile communication device, such as a cellphone, smartphone, tablet, wearable computer or laptop. The server-side components may be integral, installed or otherwise functionally associated with a digital content/application server. The server-side components may communicate execution instructions and associated content for presentation to the client-side components, while the client-side components may communicate execution instruction results to the server-side components, over the same network. Collectively, the client and server side components may function as a system to: (a) enable a digital content provider to define and/or author one or more mobile communication device operational scenarios, wherein each device operational scenario may be indicative of device user suitability for a specific digital content item; (b) distribute the one or more operational scenarios, optionally in the form of a configuration file, to each of a set of mobile communication devices; (c) monitor each of the set of communication device for an occurrence of one or more of the distributed operational scenarios; and (d) upon detection of an occurrence of a specific operational scenario associated with a specific digital content item, executing a content recommendation/distribution procedure, which procedure may optionally be encoded within the same or a related configuration file, for the specific digital content item associated with the detected operational scenario.

According to embodiments of the present invention, a mobile device operational scenario may include a condition of the mobile communication device, for example: (a) an amount of available memory; (b) an amount of available storage; (c) available battery; (d) computational load on one or more of the device processors; (e) connectivity available to the device; (f) the presence or absence of specific software on the device; (g) a date, time of day or combination of the two; and/or (h) a location of the device. A mobile device operational scenario may also include an action or series of actions performed by a device user, for example: (a) picking up the device; (b) placing the device down in a specific orientation; (c) plugging or unplugging headphones from the device; (d) plugging or unplugging the device from a charger; (e) connecting the device with other devices using Bluetooth or WiFi; and/or (f) installing, uninstalling, activating or deactivating specific applications or applications of a specific application type.

A device operational scenario may be defined by a provider (e.g. producer, distributor, promoter, etc.) of digital content in connection with the recommendation and/or distribution of one or more specific digital content items. A file or other data structure within which a device operational scenario definition may be encoded may be authored using a server-side software component of a system according to embodiments of the present invention. The file or data structure may also include a definition of a procedure to execute upon detection of an occurrence of the encoded operational scenario. An authored file or data structure, with encoded device operational scenario parameters/instructions, may be conveyed to each of a set of target devices running a client-side system component according to embodiments of the present invention. A given file may be pre-loaded with the device, by the manufacturer or a reseller (e.g. network operator), before purchase, pushed to the device or pulled by the device during activation, and or pulled by the client-side components on the device in response to detection of some specific scenario.

A client-side components, upon receiving a specific file or data structure, may load, activate and/or configure specific device monitoring routines corresponding to the device operational scenario encoded in the specific file or data structure. A client-side component running on a given mobile communication device according to embodiments may receive each of several device operational scenario files/routines and may activate monitoring routines on the given communication device for each of several device operational scenario files/routines. Upon detection of a specific device operational scenario, the client-side device may execute a specific set of instructions (e.g. to present, recommend or install specific content) associated with the detected specific device operational scenario. The instructions for execution, along with corresponding content, may be encoded in the same or in an associated file/data-structure as the one including the operational scenario definition, or the instructions and/or content may be provided by a server-side component responsive to the server-side component receiving an indication of a detection of an occurrence of a specific scenario from the client-side component.

Execution instructions provided to, and executed by, a client-side software component according to embodiments may include instructions to: (a) render and/or present to a user of the device specific content (e.g. notifications, recommendations, digital ads, etc.) which may either have been preloaded or needs to be retrieved from a server-side component; (b) download specific digital content; and/or (c) install, with or without device user approval, specific digital content. A digital content item according to embodiments of the present invention may include: (a) a software application; (b) configuration data for a software application; (c) a link to download a software application; (d) a notification; (e) a multimedia file or stream; (f) a digital ad including a link to an online service; and/or (g) a digital ad to for a physical retailer.

A digital content recommendation and distribution system according to further embodiments may also monitor and report mobile device user responses to specific digital content recommendations. According to yet further embodiments, a digital content recommendation and distribution system may monitor and report mobile device user consumption of usage of specific digital content recommend and/or otherwise provided through the system.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4A is a diagram of system information flow and content flow according to embodiments of the present invention; and FIG. 4B is a set of exemplary device screens presented in accordance with embodiments of the present invention.

Figure 1A:
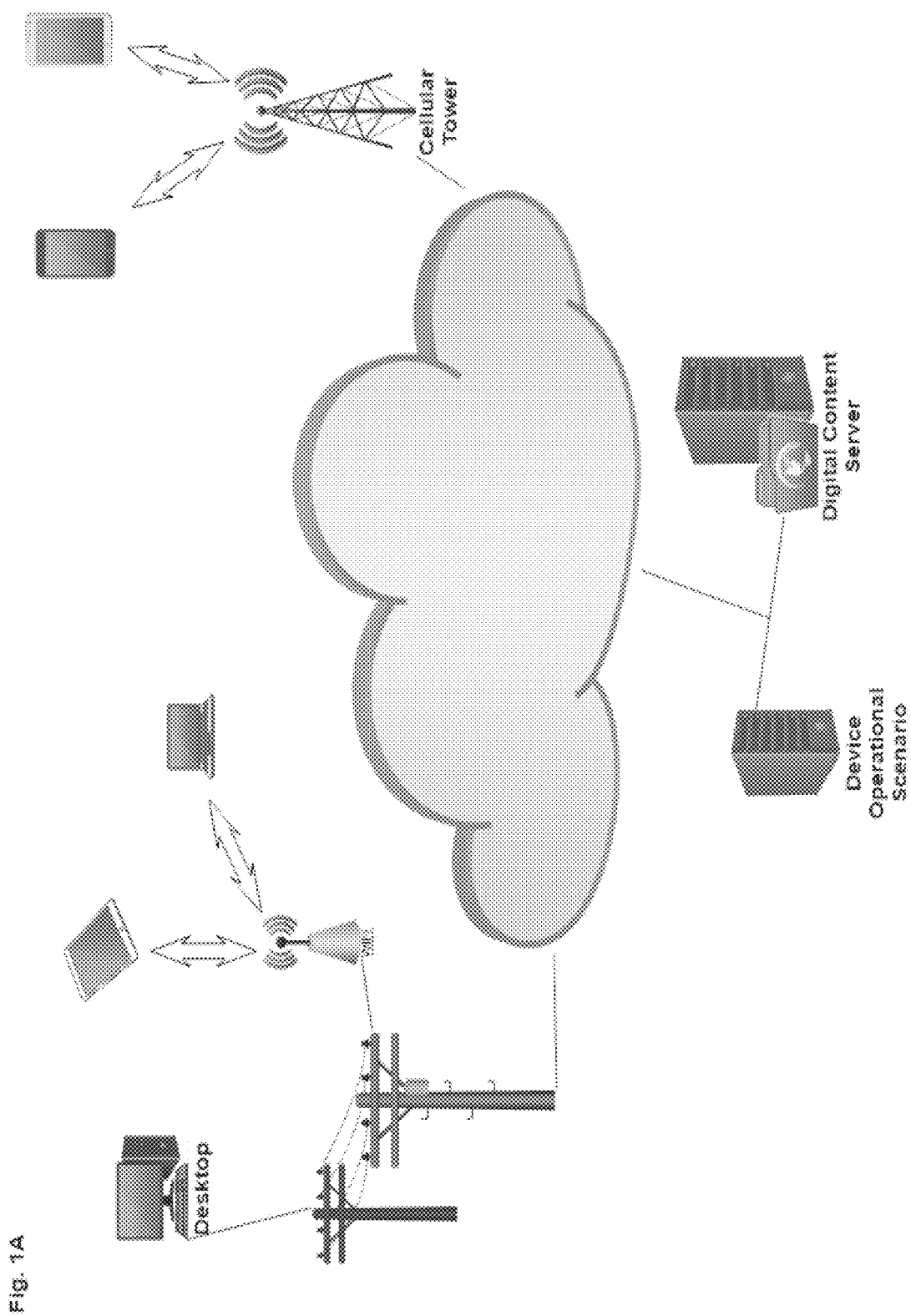
FIG. 1A shows an illustration of an exemplary data packet distribution network with wired, wireless and cellular network access points, and including networked devices communicating through the network with servers configured according to embodiments of the present invention, such that collectively there is formed a content recommendation and distribution system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE FIGURES

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, may refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), any composition and/or architecture of semiconductor based Non-Volatile Memory (NVM), any composition and/or architecture of biologically based Non-Volatile Memory (NVM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other functionally suitable components may be used.

The present invention includes methods, circuits, devices, systems and functionally associated machine executable code for recommendation and distribution of digital content. The term digital content, for purposes of this application, may mean any one or combination of the following: (a) downloaded content such audio and video, (b) streamed content, (c) interactive content from an online source or website, (d) downloaded and installed application, and/or (e) a non-installed application running in a browser, or other runtime environment or sandbox. A system according to some embodiments, may include both server-side components and client-side components, which components may each function independently and substantially autonomously part of the time, and may synchronize with one another intermittently. The client-side components may be integral, installed or otherwise functionally associated with an operating system of a mobile communication device, such as a cellphone, smartphone, tablet, wearable computer or laptop. The server-side components may be integral, installed or otherwise functionally associated with a digital content/application server. The server-side components may communicate execution instructions and associated content for presentation to the client-side components, while the client-side components may communicate execution instruction results to the server-side components, over the same network. Collectively, the client and server side components may function as a system to: (a) enable a digital content provider to define and/or author one or more mobile communication device operational scenarios, wherein each device operational scenario may be indicative of device user suitability for a specific digital content item; (b) distribute the one or more operational scenarios, optionally in the form of a configuration file, to each of a set of mobile communication devices; (c) monitor each of the set of communication device for an occurrence of one or more of the distributed operational scenarios; and (d) upon detection of an occurrence of a specific operational scenario associated with a specific digital content item, executing a content recommendation/distribution procedure, which procedure may optionally be encoded within the same or a related configuration file, for the specific digital content item associated with the detected operational scenario.

According to embodiments of the present invention, a mobile device operational scenario may include a condition of the mobile communication device, for example: (a) an amount of available memory; (b) an amount of available storage; (c) available battery; (d) computational load on one or more of the device processors; (e) connectivity available to the device; (f) the presence or absence of specific software on the device; (g) a date, time of day or combination of the two; and/or (h) a location of the device. A mobile device operational scenario may also include an action or series of actions performed by a device user, for example: (a) picking up the device; (b) placing the device down in a specific orientation; (c) plugging or unplugging headphones from the device; (d) plugging or unplugging the device from a charger; (e) connecting the device with other devices using Bluetooth or Wi-Fi; and/or (f) installing, uninstalling, activating or deactivating specific applications or applications of a specific application type.

A device operational scenario may be defined by a provider (e.g. producer, distributor, promoter, etc.) of digital content in connection with the recommendation and/or distribution of one or more specific digital content items. A file or other data structure within which a device operational scenario definition may be encoded may be authored using a server-side software component of a system according to embodiments of the present invention. The file or data structure may also include a definition of a procedure to execute upon detection of an occurrence of the encoded operational scenario. An authored file or data structure, with encoded device operational scenario parameters/instructions, may be conveyed to each of a set of target devices running a client-side system component according to embodiments of the present invention. A given file may be pre-loaded with the device, by the manufacturer or a reseller (e.g. network operator), before purchase, pushed to the device or pulled by the device during activation, and or pulled by the client-side components on the device in response to detection of some specific scenario.

A client-side component, upon receiving a specific file or data structure, may load, activate and/or configure specific device monitoring routines corresponding to the device operational scenario encoded in the specific file or data structure. A client-side component running on a given mobile communication device according to embodiments may receive each of several device operational scenario files/routines and may activate monitoring routines on the given communication device for each of several device operational scenario files/routines. Upon detection of a specific device operational scenario, the client-side device may execute a specific set of instructions (e.g. to present, recommend or install specific content) associated with the detected specific device operational scenario. The instructions for execution, along with corresponding content, may be encoded in the same or in an associated file/data-structure as the one including the operational scenario definition, or the instructions and/or content may be provided by a server-side component responsive to the server-side component receiving an indication of a detection of an occurrence of a specific scenario from the client-side component.

Execution instructions provided to, and executed by, a client-side software component according to embodiments may include instructions to: (a) render and/or present to a user of the device specific content (e.g. notifications, recommendations, digital ads, etc.) which may either have been preloaded or needs to be retrieved from a server-side component; (b) download specific digital content; and/or (c) install, with or without device user approval, specific digital content. A digital content item according to embodiments of the present invention may include: (a) a software application; (b) configuration data for a software application; (c) a link to download a software application; (d) a notification; (e) a multimedia file or stream; (f) a digital ad including a link to an online service; and/or (g) a digital ad to for a physical retailer.

A digital content recommendation and distribution system according to further embodiments may also monitor and report mobile device user responses to specific digital content recommendations. According to yet further embodiments, a digital content recommendation and distribution system may monitor and report mobile device user consumption of usage of specific digital content recommend and/or otherwise provided through the system.

Figure 1B:
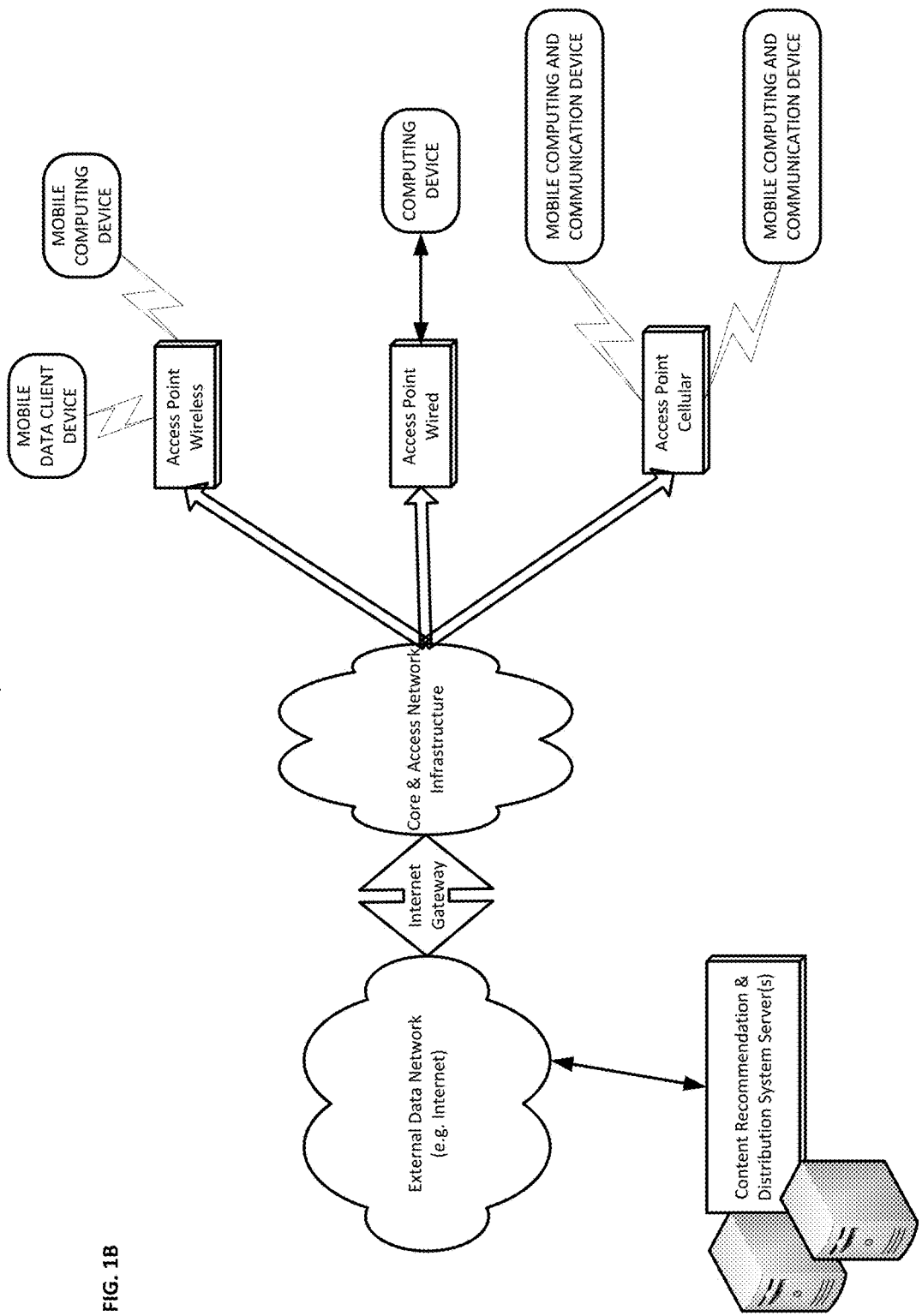
FIG. 1B shows a functional block diagram of an exemplary data packet distribution network with wired, wireless and cellular network access points, and including networked devices communicating with servers that are connected to the network through an Internet Gateway and configured according to embodiments of the present invention.

Turning now to FIG. 1A, there is shown an illustration of an exemplary data packet distribution network with wired, wireless and cellular network access points, and including networked devices communicating through the network with servers configured according to embodiments of the present invention, such that collectively there is formed a content recommendation and distribution system according to embodiments of the present invention. FIG. 1B shows a functional block diagram of the exemplary data packet distribution network with wired, wireless and cellular network access points, and including networked devices communicating with servers that are connected to the network through an Internet Gateway and configured according to embodiments of the present invention. According to such an embodiment, the content recommendation and distribution system may be independent of any network operator. It could be part of a marketplace or platform on the internet and open to multiple content providers and/or promoters. Client-side software components according to such an embodiment may be downloaded or pre-installed by the device producer, distributor or retailer.

Figure 1C:
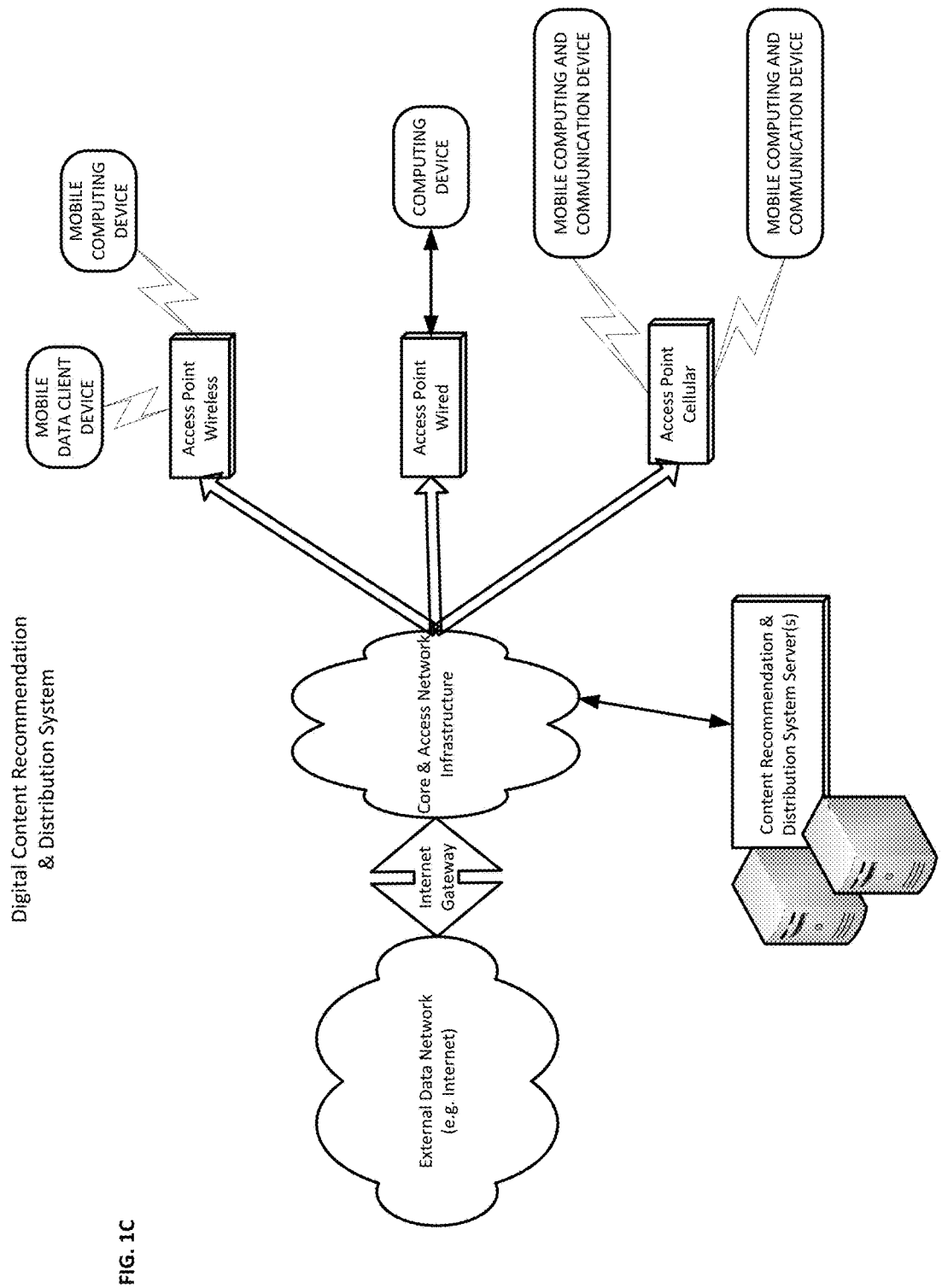
FIG. 1C shows a functional block diagram of an exemplary data packet distribution network with wired, wireless and cellular network access points, and including networked devices communicating with servers connected directly into the network and configured according to embodiments of the present invention.

Turning now to FIG. 1C, there is shown a functional block diagram of an exemplary data packet distribution network with wired, wireless and cellular network access points, and including networked devices communicating with servers connected directly into the network and configured according to embodiments of the present invention. According to such an embodiment, the content recommendation and distribution system may be controller by the network operator. It could be part of a proprietary marketplace or platform controlled by the operator. Client-side software components according to such an embodiment may be pushed to, or pre-installed on, the device by the operator. The system may provide a platform for the operator to help a user customize their devices. It may provide the operator with the ability to promote services, applications and to push advertising.

Figure 2A:
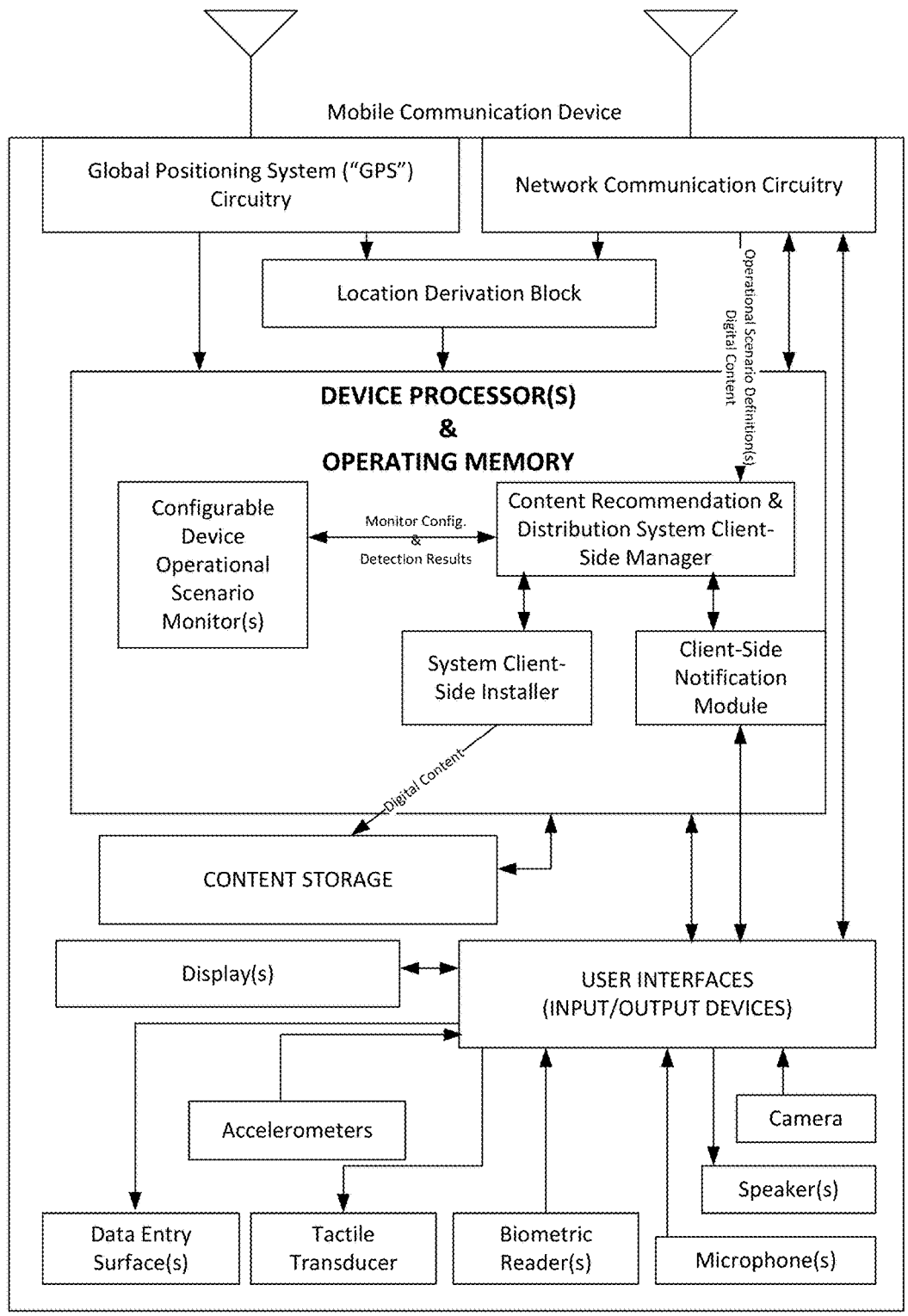
FIG. 2A is a functional block diagram of a communication device according to embodiments of the present invention and illustrating a relationship between functional blocks of the exemplary communication device in accordance with embodiments of the present invention.
Figure 2B:
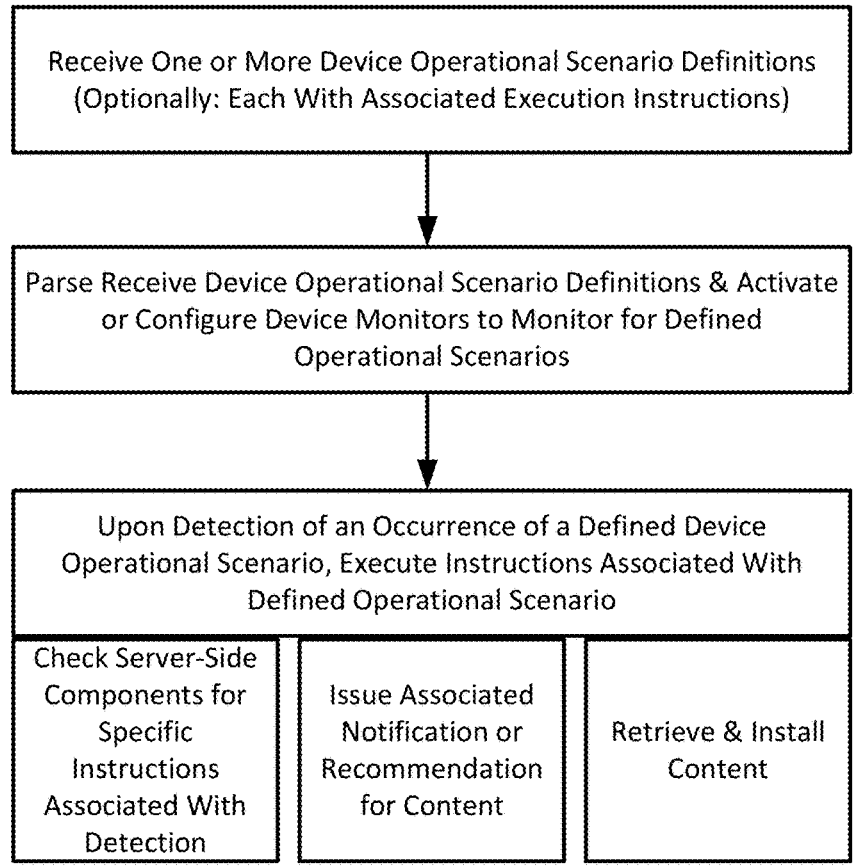
FIG. 2B is a flowchart including exemplary steps of functions performed by an exemplary mobile communication device according to embodiments of the present invention.

FIG. 2A is a functional block diagram of a communication device according to embodiments of the present invention and illustrating a relationship between functional blocks of the exemplary communication device in accordance with embodiments of the present invention. The device includes communication and computing circuits, and on the computing circuits a client-side system components. The client-side system components include a system manager which communicates through the communication circuits with one or more system servers. The client-side components also include configurable device operational scenario monitors, a content/notification module and a content installer. The device of FIG. 2A may operate in according the flow shown in FIG. 2B, which figure shows a flowchart including exemplary steps of functions performed by an exemplary mobile communication device according to embodiments of the present invention. More specifically, the client-side system manager, or functionally associated module, may receive one or more device operational scenario definitions, in the form of a file or data-structure, and may parse the definitions to determine which device monitors, optionally including monitoring routines, to activate and/or to configure. Once an occurrence of a specific defined scenario is detected by a monitor or monitoring routine, the client-side system manager, or functionally associated module, may execute instructions associated with the specific scenario. The instructions may have been sent with the scenario definition and/or subsequently downloaded from the system server(s). The instructions to be executed upon a scenario occurrence may include or point to specific content. The instructions may either present to a device user some associated content (notification), recommend to the device user to download/install specific content, and/or may automatically download to the device specific content.

One example of a device operational scenario is that the available storage on the device falls below a certain value and the user fails in installing another software application. Exemplary corresponding instructions in this case could be to present/notify the user with content suggesting a cloud storage solution which will free up space on their device. The digital content may be an ad for the cloud storage solution. Alternatively, instructions in this case could be to install and run a compression application on the device.

Another exemplary device operational scenario would be the device arrives at a geolocation known to the system to be an airport and the device remains there for period indicating an upcoming flight/departure to destinations unknown. The corresponding instructions for execution in this case could be to download content prior to take-off and to automatically present the download content upon landing. This scenario/content combination may be useful in cases when the device user travels to a location where they will not have network connectivity.

Figure 3A:
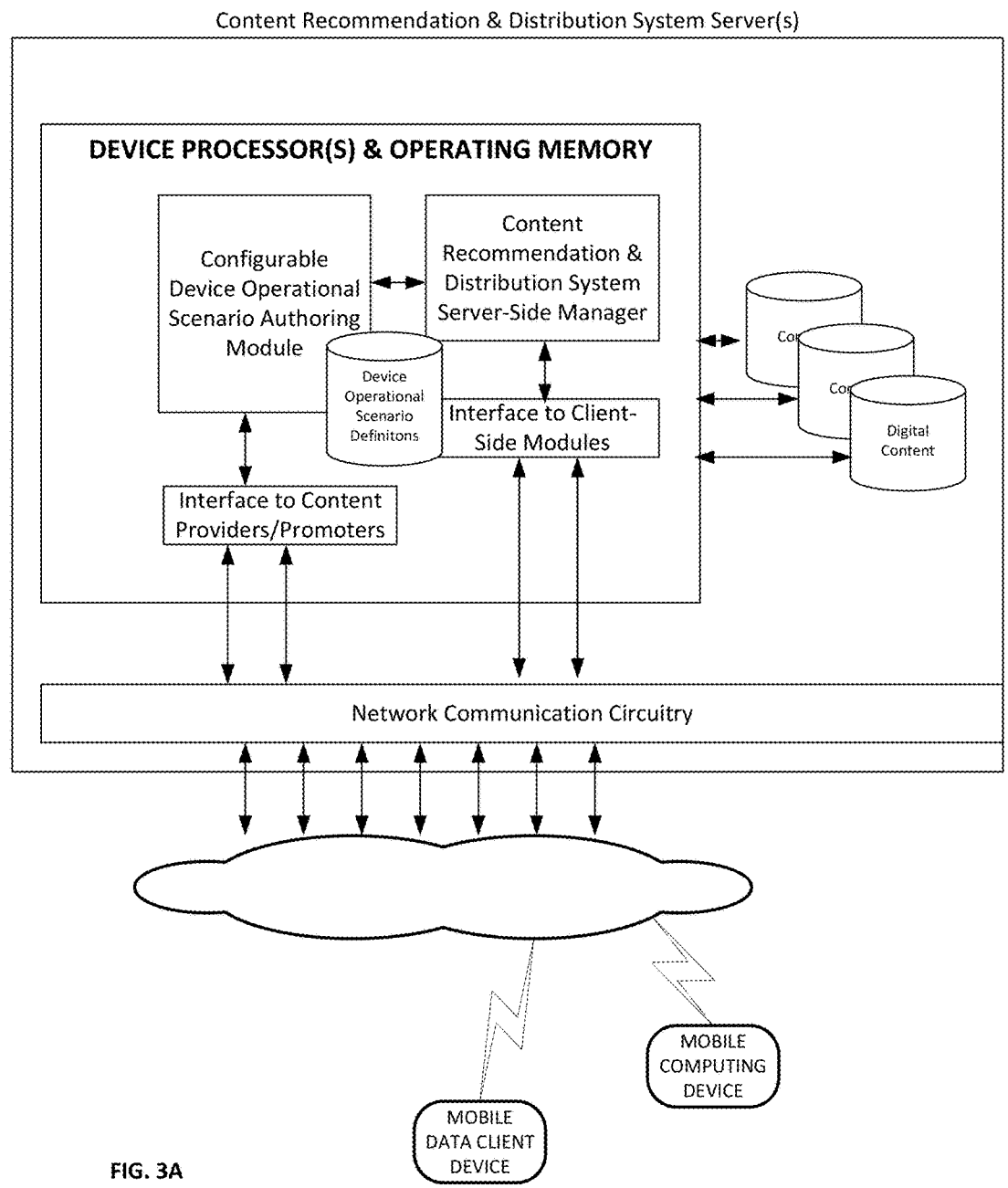
FIG. 3A is a functional block diagram of an exemplary recommendation/distribution server(s) according to embodiments of the present invention and illustrating a relationship between functional blocks of exemplary content recommendation and distribution server according to embodiments of the present invention.
Figure 3B:
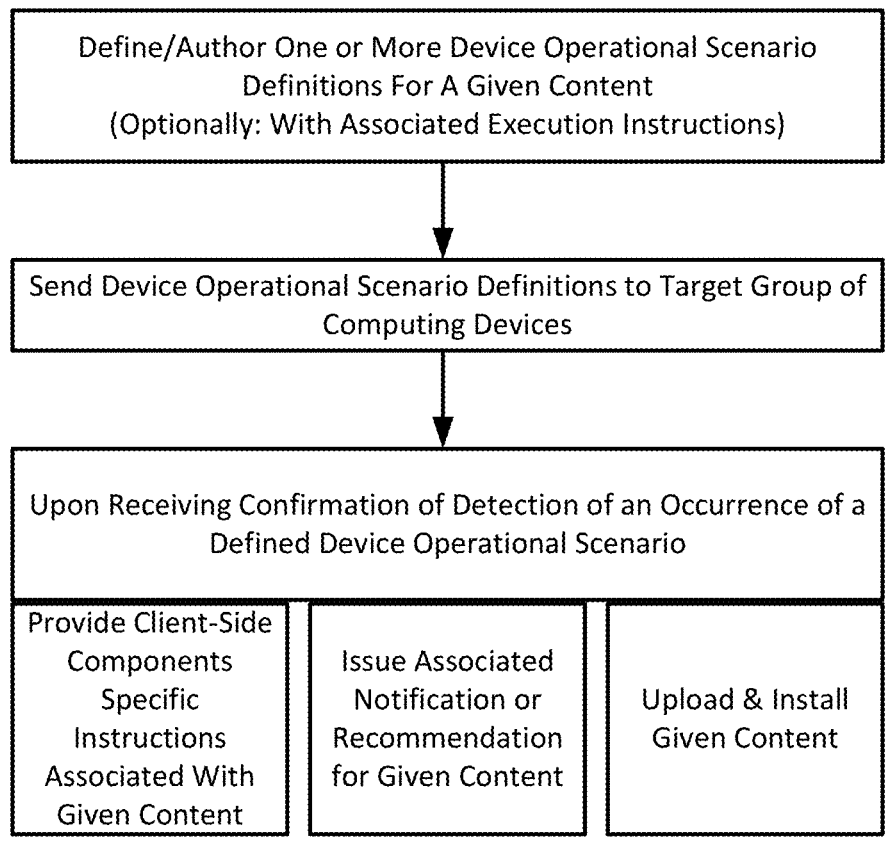
FIG. 3B is a flowchart including exemplary steps of functions performed by exemplary content recommendation and distribution server(s) according to embodiments of the present invention.

Turning now to FIG. 3A, there is shown a functional block diagram of exemplary recommendation/distribution server(s) according to embodiments of the present invention and illustrating a relationship between functional blocks of exemplary content recommendation and distribution server according to embodiments of the present invention. The operation of the server(s) may be described in conjunction with the flowchart of FIG. 3B, which flowchart includes exemplary steps of functions performed by exemplary content recommendation and distribution server(s) according to embodiments of the present invention. The server-side components include a device operational scenario authoring module to allow a provider or promotor of specific content to script a device operational scenario definition which may indicate a suitable scenario in which to recommend or otherwise provide the specific content. The script may include a listing of actions/instruction to execute upon a detection of the defined scenario occurring on a target device. The script may include and/or point (e.g. an internet link) to the specific content which the script is intended to recommend, provide or install. Interface a provide to the authoring module. The server(s) also include interface to the client-side component or modules via a data packet network. There are also provided data stores including content to be sent to the communication devices.

Turning now to FIG. 4A, there shown a diagram of a system information flow and content flow according to a specific embodiment of the present invention referred to as AppCloud CMS. The system embodiment of FIG. 4A shows the content distribution/management system segmented into an AppCloud catalog of content, and into a decision engine which is in communication with several devices which receive content from the CMS. FIG. 4B shows a set of exemplary device screens presented in accordance with certain embodiments of the present invention, including those associated with the AppCloud CMS.

Functions, operations, components and/or features described herein with reference to one or more embodiments, may be combined or otherwise utilized with one or more other functions, operations, components and/or features described herein with reference to one or more other embodiments, or vice versa. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A content distribution system comprising:
a content server, associated with a content provider, communicatively coupled to a data packet network and running one or more server-side components to selectively send customized content intended to improve the functionality of a mobile device to a mobile computing device based on one or more operational scenarios detected on the mobile computing devices, wherein specific content is sent to the mobile computing device in response to detection of one or more specific operational scenarios, and includes machine executable code to alter one or more operational capabilities of one the mobile computing device; and
a mobile computing device also communicatively coupled to the data packet network and running a client-side component, and configured to:
(a) receive from said one or more server-side components, a mobile device operational scenario including a definition of user actions performed on the device, for the mobile device operational scenario;
(b) activate or configure one or more monitoring routines to monitor the user actions performed on the device, defined within the received device operational scenario definition;
(c) monitor said mobile computing device for an occurrence of the user actions performed on the device, associated with the defined operational scenario using the activated or configured monitoring routines;
(d) notify said one or more server-side components of detected occurrences of the user actions performed on the device, when the detected occurrences have met the mobile device operational scenario definition;
(e) receive customized content, as determined by the content provider, from the server-side component responsive to the notification;
(f) install the received customized content; and
(g) monitor and report mobile device user consumption of the installed customized content.

2. A wireless communication device comprising:
communication circuits to receive and transmit data, including installable customized content intended to improve the functionality of a mobile device, over a wireless communication network; and
processing circuits functionally associated with a digital operating memory and with a digital storage, wherein the processing circuits are adapted to:
(a) receive from more server-side components running on a server connected to the wireless communication network, a mobile device operational scenario definition;
(b) activate or configure one or more monitoring routines to monitor user actions performed on the device, defined in accordance with the device operational scenario associated with the functionality of the said received mobile device operational scenario definition;
(c) monitor said mobile computing device for an occurrence of the user actions performed on the device, associated with the defined operational scenario using the activated or configured monitoring routines, wherein the mobile device operational scenario definition includes one or more user actions performed on the device;
(d) notify the one or more server-side components of detected occurrences of the user actions performed on the device, when the detected occurrences have met the said mobile device operational scenario definition;
(e) receive customized content, as determined by the content provider, intended to improve the functionality of the said mobile device from the server-side component responsive to the notification;
(f) install received customized content on said device; and
(g) monitor and report mobile device user consumption of the installed customized content.

* * * * *